US007894065B2

(12) United States Patent
Kohlbrenner et al.

(10) Patent No.: US 7,894,065 B2
(45) Date of Patent: Feb. 22, 2011

(54) INK SPLITTING CORRECTION METHOD

(75) Inventors: Adrian Kohlbrenner, Thalwil (CH); Peter Ehbets, Zürich (CH); Wolfgang Geissler, Bad Schönborn (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 490 days.

(21) Appl. No.: 12/021,524

(22) Filed: Jan. 29, 2008

(65) Prior Publication Data

US 2008/0201110 A1 Aug. 21, 2008

(30) Foreign Application Priority Data

Feb. 15, 2007 (DE) ...................... 10 2007 008 017

(51) Int. Cl.
*G01J 3/46* (2006.01)

(52) U.S. Cl. ...................................... 356/402; 356/421

(58) Field of Classification Search ......... 356/402–421, 356/430, 445; 101/484, 365, 486
See application file for complete search history.

(56) References Cited

U.S. PATENT DOCUMENTS 4,505,589 A * 3/1985 Ott et al. ..................... 356/402
4,856,903 A * 8/1989 Kipphan et al. ............. 356/400
5,050,994 A * 9/1991 Kipphan et al. ............. 356/445
5,182,721 A * 1/1993 Kipphan et al. ............. 382/112
5,724,259 A * 3/1998 Seymour et al. ............ 382/199
6,012,390 A * 1/2000 Ott et al. ..................... 101/365
6,081,608 A 6/2000 Fujii et al.
7,515,267 B2 * 4/2009 Ehbets et al. ............... 356/416
7,636,163 B2 * 12/2009 Baker et al. ................. 356/402
2007/0081204 A1 4/2007 Ehbets et al.

FOREIGN PATENT DOCUMENTS

DE 102006027067 A1 12/2006
WO 2005/108083 A1 11/2005

OTHER PUBLICATIONS

European Search Report dated Mar. 16, 2010.

* cited by examiner

*Primary Examiner*—Sang Nguyen
(74) *Attorney, Agent, or Firm*—Laurence A. Greenberg; Werner H. Stemer; Ralph E. Locher

(57) ABSTRACT

A method for the correction of measurement errors caused by surface effects induced by ink splitting during the color measurement of a printed sheet on a running printing device, includes scanning the printed sheet photoelectrically point by point and forming color and/or density measured values from scanning signals from the scanned points. Those scanned points which have a brightness exceeding a limiting value are identified, and the measured values are corrected by using the identified scanned points. In particular, during the formation of the color and/or density measured values, the scanning signals from the identified scanned points are not taken into account.

6 Claims, 2 Drawing Sheets

INK SPLITTING CORRECTION METHOD

CROSS-REFERENCE TO RELATED APPLICATION

This application claims the priority, under 35 U.S.C. §119, of German Patent Application DE 10 2007 008 017.6, filed Feb. 15, 2007; the prior application is herewith incorporated by reference in its entirety.

BACKGROUND OF THE INVENTION

Field of the Invention

The invention relates to a method for the correction of measurement errors caused by surface effects induced by ink splitting during the color measurement of a printed sheet on a running printing device, in which the printed sheet is scanned photoelectrically point by point and color and/or density measured values are formed from scanning signals from the scanned points.

In International Publication No. WO 2005/108083 A1, corresponding to U.S. Patent Application Publication No. US 2007/0081204 A1, a method and a measuring apparatus for the determination of color and/or density values for the monitoring and/or regulation of the printing process in a printing apparatus, specifically a sheetfed offset press, are described. Measuring areas of a printed sheet are measured photoelectrically during the printing process, directly in or on the running printing apparatus, and color and/or density values for the relevant measuring areas are formed from the measured values obtained in the process.

In that method, the measured values are acquired directly during the printing process by using a measuring configuration which is installed within the printing apparatus, for example a sheetfed offset printing press or generally a printer. That type of measured value acquisition or measurement will be designated “inline” in the following text. As opposed thereto, “external” designates measured value acquisition outside the printing apparatus in a stable state of the printed product.

The inline measuring technique is considerably more complex than the conventional external color measuring technique. The inline measurement has to be carried out shortly after the application of ink. At that time, the ink layer is not yet stable. It is influenced by various printing process parameters and ink characteristics, which decay with different time constants. As a result, depending on the situation, large differences can arise between the inline measured values and corresponding external measured values on stable dry proofs. In addition, the process dependence makes the interpretation of the measured data more difficult. It cannot be seen unambiguously whether a measured variation has been caused by a change in the application of ink or by a change in the process parameters. Measured values determined inline and externally are therefore not directly comparable.

The differences between measured values determined inline and externally have to be corrected for the practical use of the inline measured values. That correction is generally designated as ink splitting correction.

International Publication No. WO 2005/108083 A1, corresponding to U.S. Patent Application Publication No. US 2007/0081204 A1, describes one approach to a solution to the problem. It relates to a specific structure of the measuring technique and measuring geometry in conjunction with computational correction methods for the inline measured values, which permit a conversion into standardized color and density measured values for appropriately stable external proofs (printed products). The known approach to a solution therefore contains a metrological component and a computational component.

The aim of the metrological component is to reduce the influence of the process-dependent interference effects to the greatest extent and as far as possible to supply unambiguous measured values. The remaining measured value deviations as compared with externally determined standardized measured values are then compensated through the use of numerical correction measures or models.

One preferred implementation of the metrological correction component mentioned, according to International Publication No. WO 2005/108083 A1, corresponding to U.S. Patent Application Publication No. US 2007/0081204 A1, is the use of polarization filters in the illumination and receiver channel of the measuring head. The polarization filters include linear polarizers and are installed in the illumination and receiver channel with polarization axes at right angles to one another.

Such a configuration of polarization filters eliminates the interference components which arise as a result of the surface effect, or at least attenuates them highly. The further measurement errors likewise described in International Publication No. WO 2005/108083 A1, corresponding to U.S. Patent Application Publication No. US 2007/0081204 A1 (in particular errors based on surface modulation of the disrupted ink layer) are, however, not attenuated or eliminated by such a measure. The computational correction components are used for that purpose.

The virtually complete elimination of the measurement errors as a consequence of the surface effect through the use of a configuration having polarization filters constitutes, from a metrological point of view, a solution which is intrinsically good. In combination with effective computational correction components, the negative influence of the ink splitting on the inline measured values, in particular, can be excluded in that way.

The use of polarization filters as a constituent part of a metrological correction component is certainly very effective, but the use of polarization filters is also associated with various disadvantages. In particular, the high attenuation of the light level is disadvantageous. In addition, installation space problems, reduced optical imaging quality and costs are further negative factors.

In the case of a non-imaging measuring technique, as is also primarily described in International Publication No. WO 2005/108083 A1, corresponding to U.S. Patent Application Publication No. US 2007/0081204 A1, computational correction of the surface effect is normally not expedient, since the disruption of the ink layer immediately after the printing is typically always still so high at the measurement location that the surface effect seen by the measuring system is very pronounced. In particular, in the case of dark surfaces, the interfering signal component which originates from the surface effect is then large as compared with the actual useful signal. Since the surface effect constitutes additive interference, a computational correction must ultimately act in a subtractive manner on the overall signal. Since, in particular, the printing process exhibits fluctuations and therefore the measurements also fluctuate, such a subtractive correction is problematic or even impractical.

SUMMARY OF THE INVENTION

It is accordingly an object of the invention to provide an alternative method for measured value correction in inline measurements, which does not exhibit the hereinafore-mentioned disadvantages of the heretofore-known methods of this general type and in which the measured value correction is intended to have the effect of minimizing differences between inline measurements and corresponding external measurements.

With the foregoing and other objects in view there is provided, in accordance with the invention, a method for correcting measurement errors caused by surface effects induced by ink splitting during color measurement of a printed sheet on a running printing device. The method comprises scanning the printed sheet photoelectrically point by point, forming color and/or density measured values from scanning signals from the scanned points, identifying scanned points having a brightness exceeding a limiting value, and correcting the measured values by using the identified scanned points.

The basic concept of the invention is not to carry out the correction of the surface effect with the aid of a polarizing filter as in International Publication No. WO 2005/108083 A1, corresponding to U.S. Patent Application Publication No. US 2007/0081204 A1, but purely computationally on the basis of image data from a line or surface camera which is mounted in the press and observes the just printed paper.

The method according to the invention is based on the finding that the surface effect induced by the ink splitting, which adds an interference term to the measurement, occurs very locally and with an area coverage which is very small overall. If the printed image is scanned with a camera, the interference effects can be detected in the camera image as individual fine, but at the same time, extremely bright, points. The basic concept of the invention is then, that these extremely bright points are identified in the image and their influence on the measured result is eliminated. This can be done by not taking these bright points into account either for the formation of the measured values of interest or by calculating the proportion of the area of these points in the total image and their average brightness, which means that the surface effect can be determined quantitatively and used for the correction of the measured result. The method according to the invention therefore constitutes an image-based correction of the surface effect.

In order to carry out the method according to the invention, an imaging sensor (e.g. a line or surface camera) is needed, which is fitted in such a way that it is able to record the printed image at a suitable location with high quality. In a sheetfed offset printing press, for example, it is virtually exclusively the last printing unit which is suitable in this case, with the measuring location then being found on the impression cylinder. However, the method can also be implemented with a sensor scanning point by point if it has a sufficiently high local resolution.

The image-based correction according to the invention can be applied particularly expediently in measuring systems which operate exclusively with imaging sensors. Such a measuring system includes, for example, a line camera, which observes the printed sheets just printed only a few centimeters after the press nip, still on the impression cylinder. In order to meet the requirements of the printing control, such a camera is equipped with suitable light sources and/or filters which define a spectral sensitivity of the camera that is expedient for the printing control. A camera that is suitable for the requirements of the printing control is additionally equipped with at least three separate spectral subregions, for example cyan, magenta, yellow density. It is precisely in such imaging measuring systems that the equipment with polarizing filters is not simple and therefore a computational correction is particularly expedient.

If such a camera system is employed in the printing control (that is to say in particular for the semi-automatic or wholly automatic driving of the actuating elements in the ink fountains of the printing units) then, during printing operation, this will continuously create images of what is known as the color measuring strip and transmit them to a measurement computer. The measurement computer extracts the image of the color measuring strip from the overall image, if this has not already been done at an earlier processing stage, and ultimately then extracts the images of the individual measuring areas of the strip. The measured variables of interest for the printing control can then be determined from these partial images. This is advantageously done through the use of suitable averaging of the measured values from the individual image points within a measuring area.

The measured values determined in this way in the running press are then afflicted with the errors mentioned at the beginning and induced by the ink splitting. However, without correction thereof, accurate printing process control is not possible.

Now, the method according to the invention provides that, by using the image data from the partial images which are intended to be used for the printing control, image or scanned points with a particularly high surface effect component and/or the intensity of the surface effect as a whole, are determined. This is done in such a way that, in the image data, those image or scanned points having a brightness which exceeds a specific threshold value, are identified.

Then, in a particularly simple embodiment of the invention, the correction can be made in such a way that the identified bright image points (and, if appropriate, also adjacent image points) are excluded from the further processing. This means that the above-described averaging of the measured values of image points to form measured values for the printing control is then carried out without the image or scanned points distorted by an intense surface effect.

In a further embodiment of the invention, following the identification of the bright image points, their proportion of the area in the image of the measuring area is determined (number of particularly bright image points in relation to the total number of image points in the measuring area). In addition, their average brightness is preferably also calculated. Therefore, the surface effect can be determined quantitatively. The quantitative knowledge of the surface effect is of interest in particular since, by using it, the error-afflicted measurements of a second, non-imaging system can be corrected. In particular, a combination of an imaging part system for image inspection (that is to say, for example, for image defect detection, but in particular not for the color control of the press) with a non-imaging part system (for example a spectrophotometer measuring point by point) is conceivable for the color control of the press (see FIG. 4).

The corrections described correct only the proportion of the measurement error which is induced by the surface effect caused by the ink splitting. The corrections described therefore constitute a type of "virtual" polarization filter. For the purpose of optimal correction of the total error caused by the ink splitting, further computational corrections, as described in International Publication No. WO 2005/108083 A1, corresponding to U.S. Patent Application Publication No. US 2007/0081204 A1, are also carried out in practice. However, they are not the subject matter of the present invention and therefore require no further explanation.

However, it is not only the system just described having a line camera that is conceivable. The method according to the invention is not restricted to the use of imaging measuring systems (line or surface camera). It is also possible to use a non-imaging measuring system, such as described for example in International Publication No. WO 2005/108083 A1, corresponding to U.S. Patent Application Publication No. US 2007/0081204 A1 for the scanning of the proof. The combination of non-imaging, colorimetric sensors (for example point measuring instruments with spectrophotometers) with imaging sensors (for example a camera system for image inspection) is particularly expedient for the method according to the invention. The image information from the imaging sensors (the camera) can then be used for the purpose of correcting the measurement errors (caused by the surface effect) of the non-imaging sensors in the manner described above.

Given the use of imaging sensors, the image information can additionally be used to detect defective measuring areas. In particular, in this way smearing (particularly when starting up the press) and defects (hickeys) in the printed image can be detected and the corresponding measuring areas can be excluded from the printing control. This is particularly expedient when a combination of non-imaging and imaging sensors is used.

Other features which are considered as characteristic for the invention are set forth in the appended claims.

Although the invention is illustrated and described herein as embodied in an ink splitting correction method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
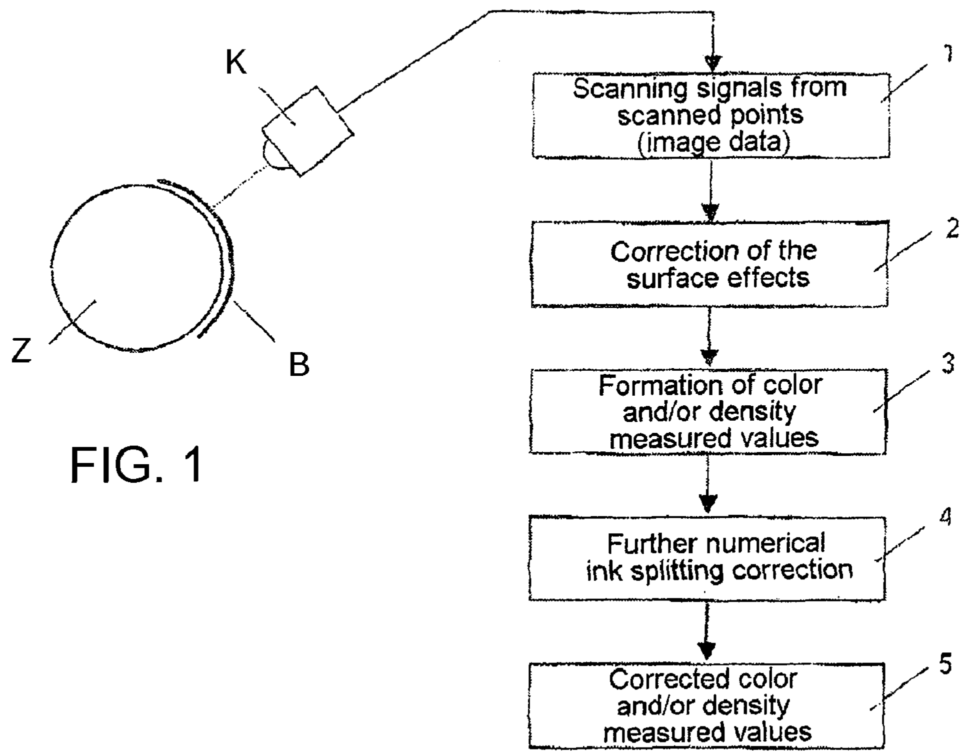
FIG. 1 is a diagrammatic, side-elevational view of an impression cylinder with a sheet and a line camera as well as a flow diagram illustrating the method according to the invention.

Referring now to the figures of the drawings in detail and first, particularly, to FIG. 1 thereof, there is seen a printed sheet B which is located on a last impression cylinder Z of a printing press and is scanned photoelectrically point by point through the use of an imaging scanning device in the form of a line camera K. A two-dimensional image is generated in this case by scanning the printed sheet line by line. Image data obtained in the process in the form of scanning signals from all of the scanned image or scanned points, is represented in a box 1. Suitable imaging scanning devices are known and are not the subject matter of the present invention.

Color and/or density measured values which are formed from the scanning signals in a manner that is known per se can, for example, be used for the control of the printing press. Specifically, in this case, the scanning signals from image points from the measuring areas of a color control strip normally present on the printed sheet are evaluated. The whole of the color and/or density measured values are represented in a box 3.

According to the invention, when forming the color and/or density measured values, a correction of the surface effects induced by the ink splitting is carried out. This is symbolized in a box 2.

Then, further numerical corrections, for example known from International Publication No. WO 2005/108083 A1, corresponding to U.S. Patent Application Publication No. US 2007/0081204 A1, are carried out, which correct the other measurement errors induced by ink splitting and not attributable to surface effects. This is represented in a box 4.

As a result of all of the corrective steps, color and/or density measured values corrected for ink splitting are finally present, as is represented in a box 5.

Figure 2:
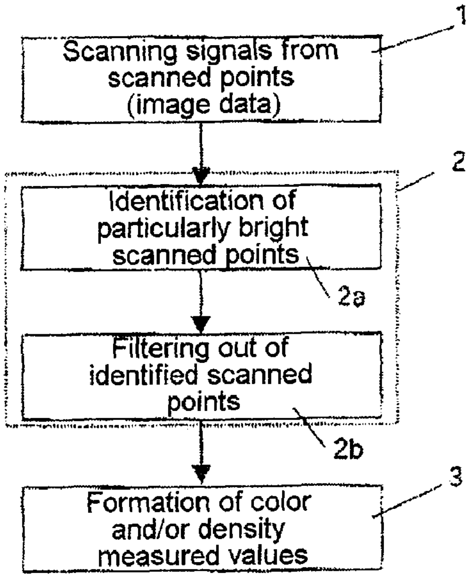
FIG. 2 is a flow diagram of an embodiment of the method.

An extremely simple embodiment of the correction method according to the invention is illustrated in somewhat more detail in FIG. 2.

Those scanned points having a brightness which exceeds a specific limiting value $I_G$ (FIG. 3) are identified (box 2*a*) from the image data (box 1). These identified scanned points are then filtered out (box 2*b*), that is to say the scanning signals from these identified scanned points are not taken into account for the subsequent formation of the color and/or density measured values (box 3).

Figure 3:
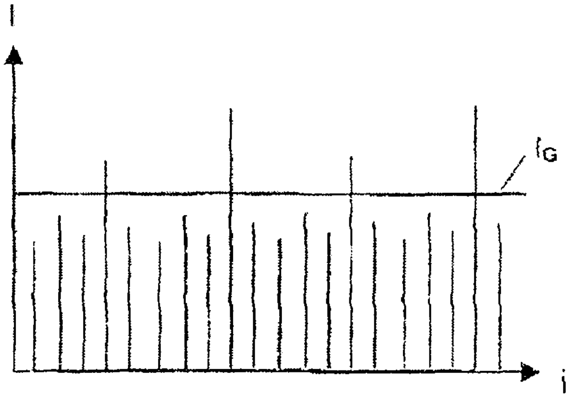
FIG. 3 is a brightness distribution diagram clarifying the method.

FIG. 3 shows a portion of a typical measured brightness distribution over the scanned points of a printed sheet. The x axis indicates the individual scanned points i and the y axis their brightnesses I. The brightness of most scanned points lies below the limiting value $I_G$. Where the surface of the ink layer on the printed sheet is disrupted by the ink splitting, extremely bright scanned points are measured. The number or the proportion of the area of these extremely bright scanned points is, however, relatively low. Scanned points having a brightness lying above the limiting value $I_G$ are filtered out, as already stated, and not taken into account for the formation of the color and/or density measured values. The limiting value $I_G$ is defined empirically on the basis of sample measurements in such a way that inline measured results and external measured results are comparable as far as possible.

Figure 4:
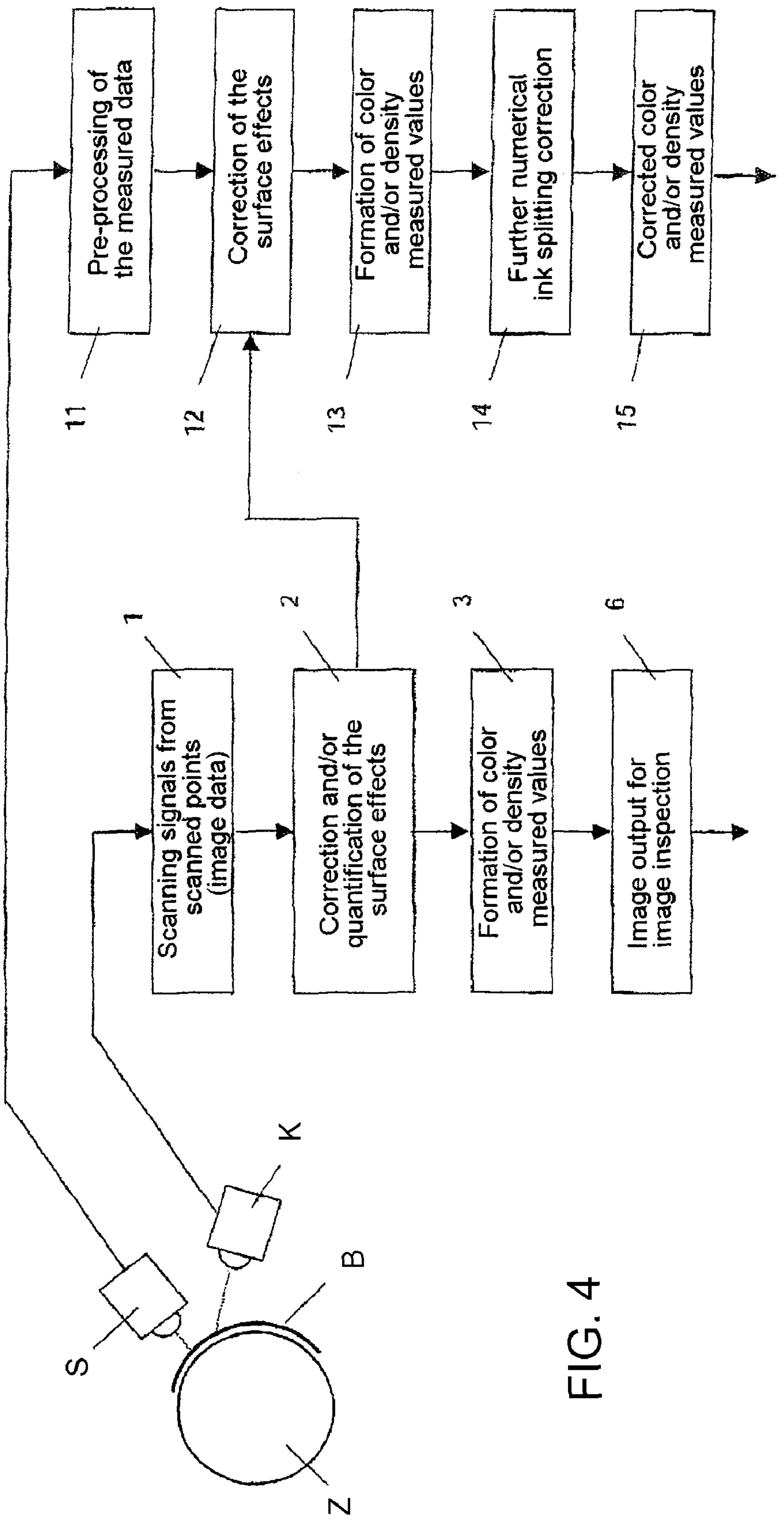
FIG. 4 is a side-elevational view of an impression cylinder with a sheet, a line camera and a measuring instrument as well as a flow diagram illustrating a further embodiment of the method.

FIG. 4 illustrates a variant of the method according to the invention in which, in order to scan the printed sheet B, a combination of a line camera K and a point measuring instrument S, in particular a spectrophotometer, is used.

Color and/or density measured values (box 3) are formed from the scanning signals from the line camera K (image data in box 1) and used for image inspection (box 6). Previously, as described by using FIG. 1, a correction of the surface effects was carried out (box 2).

The measured signals from the point measuring instrument S are firstly pre-processed in the usual way (box 11) and then converted into color and/or density measured values (box 13). In the process, a correction of the surface effects is carried out (box 12), with the evaluation of the image data from the line camera being used. Then, further numerical corrections for the remaining measurement errors (box 14) are carried out once more and, finally, the output of the corrected color and/or density measured values (box 15), for example for the purpose of printing press control.

The invention claimed is:

1. A method for correcting measurement errors caused by surface effects induced by ink splitting during color measurement of a printed sheet on a running printing device, the method comprising the following steps:

scanning the printed sheet photoelectrically point by point;

forming at least one of color or density measured values from scanning signals from the scanned points;

identifying scanned points having a brightness exceeding a limiting value;

correcting the measured values by using the identified scanned points; and storing the measured values in a memory for later use.

2. The method according to claim 1, which further comprises during the formation of at least one of a color or density measured value for a measuring area located on the printed sheet, averaging the scanning signals from at least some of the scanned points lying within the measuring area.

3. The method according to claim 1, which further comprises during the formation of at least one of the color or density measured values, at least one of the color or density measured values are corrected while not taking the scanning signals from the identified scanned points into account.

4. The method according to claim 1, which further comprises determining a proportion of the area of the scanned points having a brightness exceeding the limiting value and calculating a magnitude of the surface effect from the determined proportion.

5. The method according to claim 1, which further comprises carrying out the step of identifying the scanned points having a brightness exceeding the limiting value, with an imaging scanning system.

6. The method according to claim 1, which further comprises carrying out the step of identifying the scanned points having a brightness exceeding the limiting value, with a line or surface camera.

* * * * *

UNITED STATES PATENT AND TRADEMARK OFFICE

CERTIFICATE OF CORRECTION

PATENT NO. : 7,894,065 B2
APPLICATION NO. : 12/021524
DATED : February 22, 2011
INVENTOR(S) : Adrian Kohlbrenner et al.

It is certified that error appears in the above-identified patent and that said Letters Patent is hereby corrected as shown below:

Item (73) should read as follows:

Item (73) Assignee: Heidelberger Druckmaschinen AG,
Heidelberg (DE)
X-Rite Europe AG,
Regensdorf (CH)

Signed and Sealed this
Nineteenth Day of July, 2011

David J. Kappos
*Director of the United States Patent and Trademark Office*